May 30, 1961     D. J. DEAN     2,986,303

ELECTRICAL MEASURING INSTRUMENT

Filed July 24, 1958

United States Patent Office 2,986,303
Patented May 30, 1961

2,986,303
ELECTRICAL MEASURING INSTRUMENT
Derek John Dean, Potters Bar, England, assignor to Daystrom, Incorporated, Murray Hill, N.J., a corporation of New Jersey
Filed July 24, 1958, Ser. No. 750,820
Claims priority, application Great Britain Aug. 27, 1957
1 Claim. (Cl. 220—82)

This invention relates to electrical measuring instruments and is more particularly concerned with an improved construction which provides increased protection for the instrument mechanism against severe mechanical shocks and vibration, which provides water-tight sealing of the casing and which also facilitates the assembly and securing of the instrument mechanism within its casing.

One object of the invention is the provision of electrical measuring instruments in which use is made of a resilient gasket which is shaped to lie adjacent the inner surface of a flanged region of the meter casing around the front or scale face of the instrument.

Another object of the invention resides in the formation in said resilient gasket of a number of channels or recesses for receiving therein a mounting plate upon which the instrument mechanism itself is carried and a superimposed transparent cover or glass.

A further object of the invention resides in the formation of an electrical measuring instrument with an outer rigid cover member having a rim wall which is adapted to compress a resilient gasket in the axial direction so as to clamp in position a mounting plate supporting the instrument mechanism and a superimposed transparent cover or glass when such cover is secured to the main meter casing.

A further object of the invention resides in the securing of an outer rigid cover member to the main body of a meter casing by means of a plurality of wedges which are adapted to be held trapped between projections on the meter casing and the cover under the influence of the pressure set up by compression of a resilient gasket forming part of the meter construction.

In order that the invention may be more readily understood one particular embodiment thereof will now be described by way of illustrative example only and with reference to the accompanying drawing in which:

Fig. 2 is an enlarged fragmentary cross-sectional view through a part of the meter casing while

Figure 1:
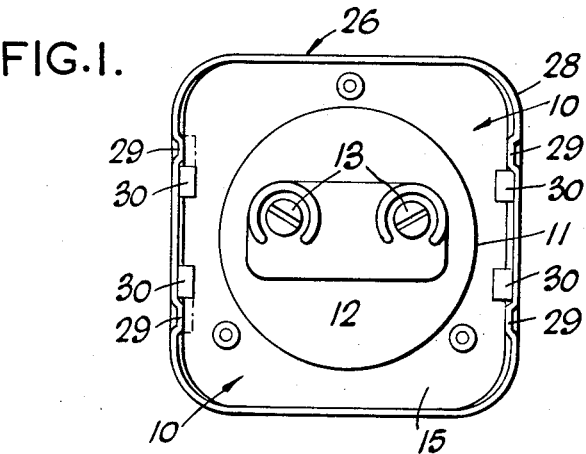
Fig. 1 is a rear elevational view of a meter embodying the invention.

Referring to the drawings the embodiment illustrated comprises a cup-shaped meter casing 10 which is conveniently, although not necessarily, of pressed sheet metal. Such casing has a side wall or base part 11 of the conventional generally cylindrical shape and which is closed at its rearward end by a, preferably integral, bottom wall 12 which carries connection terminals 13 suitably insulated from electrical contact with the casing if the latter is of metal. The open forward end of the base part 11 terminates in a laterally projecting casing flange or shoulder 14 having an outwardly turned and radially directed planar nesting surface 15, or one lying in a plane normal to the principal axis of the casing, which is provided around its outer edge with a further and forwardly or upwardly directed flange or edge wall 16. In the example shown the peripheral edge of the surface 15 is of substantially square shape and as a result the edge wall 16 defines a substantially square shape opening to form the front of a square-face type meter.

Within the enlarged forward part of the meter casing thus formed is disposed a peripheral gasket 17 made of rubber or other similar resilient material. This gasket is so shaped that it engages snugly with the inner surface of the edge wall 16 and has an axial dimension of such a value that, when it is seated at its inner end upon the surface 15, its forwardly directed outer edge surface 18 lies proud of the foremost edge of the wall 16. This gasket 17 is provided with an extension 19 leading to an integral and inwardly directed sleeve 20, the rearwardly facing surface of the extension 19 and the outer surface of the sleeve 20 being dimensioned and shaped so as to seat snugly against the adjacent surface of the seating surface 15 and the base part 11 of the meter casing.

Around the inner face of the gasket 17 there is formed a first rectangular section groove or channel 21 closely adjacent to its outermost edge 18. Such groove 21 is shaped and dimensioned to receive the instrument glass 22 or equivalent transparent closure means peripherally disposed therewithin and through which the meter scale and moving pointer can be viewed. Immediately adjacent the extension 19, the gasket 17 is also formed with a second rectangular section groove 23 around its inner surface. This groove 23 is adapted snugly to receive therein a mounting plate 24 which spans the forward open end of the base part 11 of the meter casing and carries the meter movement thereon. Upon this mounting plate 24 and secured thereto is a superimposed meter scale plate 25 carrying the requisite scale and other markings on the instrument face.

An outer cover member or rim 26, conveniently also made of pressed sheet metal, has a rim wall or inwardly directed front wall 27 adapted to overlie the forward marginal edge of the meter casing 10 and the edge surface 18 of the gasket 17. This rim or cover member 26 is further provided with a rearwardly directed side edge wall 28 integral with or joined to the rim wall 27. This edge wall 28 extends rearwardly beyond the rearward level of the seating surface 15 of the meter casing 10. The inner surface of the edge wall 28 is spaced away from the outer surface of the edge wall 16 of the casing 10 while adjacent the rearward free edge of the edge wall 28 there is provided a number of inwardly directed projections 29 at suitably spaced intervals. As shown, two of such projections 29 are provided at each of two opposite sides of the rectangular faced meter shown. If desired, however, further projections can be provided on the other two opposing edge walls or one projection made on each of the four edge walls. Such projections are conveniently formed, as shown more clearly in Fig. 2, by half-shearing and inward displacement of short lengths of the wall edge.

Figure 2:
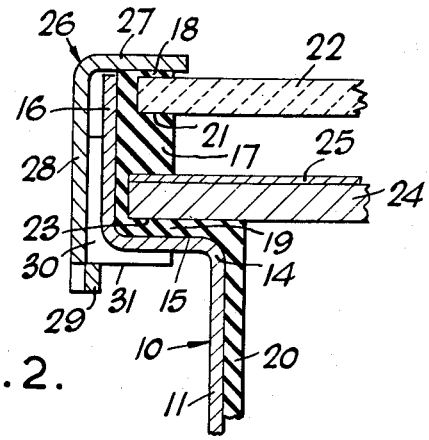
Figure 3:
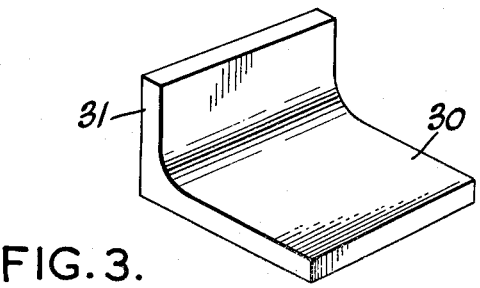
Fig. 3 is a perspective view of one of the securing wedges employed in the construction according to the invention.

A plurality of wedges or abutments 30, each comprising generally right-angularly disposed leg members as shown in Fig. 2, are employed, one in conjunction with each of the aforesaid projections 29 on the edge wall of the rim 26 so as to hold the parts in the position illustrated in Fig. 2 and whereby the gasket 17 is subjected to compression in the axial direction of the meter casing.

In assembling the instrument, the mounting plate 24 with its attached meter movement and scale plate 25 is first seated with its marginal edges located in the innermost groove 23 of the gasket 17. This is followed by location of the instrument glass 22 with its own marginal edges in the outer groove 21 of the gasket. The parts thus assembled are then inserted into the meter casing 10 so that the gasket 17 and the parts now carried thereby lie in the position shown in Fig. 2 with the inner edge of the gasket 17 and the rearward surface of the extension 19 seated against the surface 15 of the casing 10. The cover member 26 is then applied so as to overlie the forward outer edge surface 18 of the gasket 17 and axial pressure is then exerted between the meter casing and the cover so as to compress the gasket 17 axially to an extent sufficient to allow each of the wedges 30, previously inserted with one of their wedges located in the space between the edge wall 16 of the meter casing and side edge wall 28 of the cover member, to be slid laterally from the position shown in full lines in Fig. 1 to the position shown in dotted lines in the same figure. Such movement brings the rearward flange 31 of each of such wedges into alignment with the adjacent inwardly directed projection 29 on the cover so that, when the axial compression force applied is removed, such wedges engage with the inwardly directed projections 29 and serve effectively to lock the cover in a position in which it is still exerting clamping pressure upon the gasket. By suitable dimensioning of the parts the pressure then exerted can provide effective sealing of the whole of the interior of the meter casing including the space between the transparent cover plate or instrument glass 22 and the mounting plate 24 with its attached meter scale plate 25 while the resilient character of the gasket also provides for insulation of the mounting plate 24 and hence of the meter movement which is carried thereon against any mechanical shock and vibration to which the casing of the meter may be subjected.

The embodiment described in detail above is to be regarded as being illustrative only and various modifications may clearly be made without departing from the scope of the invention. For example the same broad principle of resilient seating and sealing may readily be applied to a meter casing having a face of circular or other shape. Similarly such sealing and seating means may be employed with rim or cover member constructions other than that shown and described. Similarly the cover fixing method described may be applied to a circular faced meter or a meter of any other desired form. If desired, security against accidental displacement of any of the fixing wedges 30 may be provided by forming the rearwardly directed surfaces of the flanges 31 thereof with shallow depressions or recesses shaped to receive the projections 29 of the rim 26 and thereby to lock the wedges in position when the initial compression during assembly is released.

I claim:

An electrical measuring instrument comprising a cup-shaped casing having a bottom wall and a side wall extending upwardly therefrom, a laterally projecting casing flange at the open end of the side wall and extending from and beyond the outer surface of the side wall, an upwardly projecting casing flange at the periphery of the laterally projecting casing flange and projecting upwardly and beyond the said laterally projecting casing flange, a resilient gasket disposed against the inner surface of the said flanges and extending above the upper edge of the upwardly projecting casing flange, means forming an inwardly directed channel in the said gasket, a transparent closure means peripherally disposed within the channel formed in the gasket and closing the open end of the casing, a rim member having an inwardly directed front wall and rearwardly directed side wall which extends below the laterally projecting casing flange, means forming a plurality of inwardly directed and spaced projections adjacent the free edge of the said rearwardly directed side wall of the rim member which projections are below the laterally projecting casing flange, and a plurality of abutments each comprising generally right-angularly disposed leg members, one leg member of each of the said abutments being wedged between the said upwardly directed flange on the casing and rearwardly directed edge wall of the rim member, the other leg member of each of the said abutments engaging the said laterally projecting casing flange, the abutments also engaging the inwardly directed projections formed on the said rim member, the said gasket being compressed between the inwardly directed front wall of the said rim and the laterally projecting casing flange.

References Cited in the file of this patent

UNITED STATES PATENTS

| | | |
|---|---|---|
| 1,669,685 | Weber | May 15, 1928 |
| 2,215,570 | Sylvander | Sept. 24, 1940 |
| 2,426,800 | Triplett | Sept. 2, 1947 |
| 2,599,212 | Triplett | June 3, 1952 |
| 2,691,461 | Kebbon | Oct. 12, 1954 |
| 2,861,243 | Amour | Nov. 18, 1958 |
| 2,866,940 | Lamb | Dec. 30, 1958 |